Dec. 8, 1931.    L. A. HAZELTINE    1,835,156
METHOD AND APPARATUS FOR CONVERTING DIRECT CURRENT INTO ALTERNATING
CURRENT BY ELECTROSTATICALLY CONTROLLED OSCILLATIONS
Filed Nov. 28, 1919    3 Sheets-Sheet 1
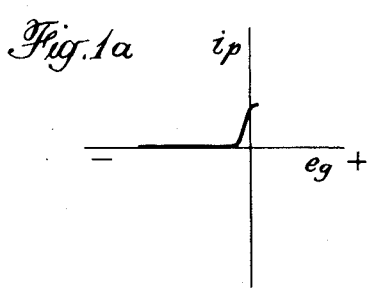
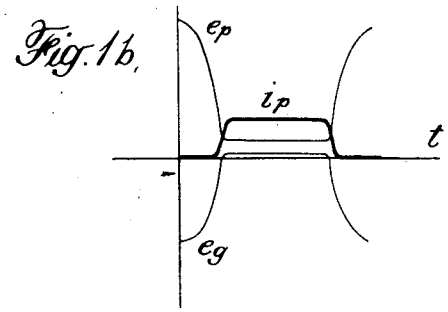
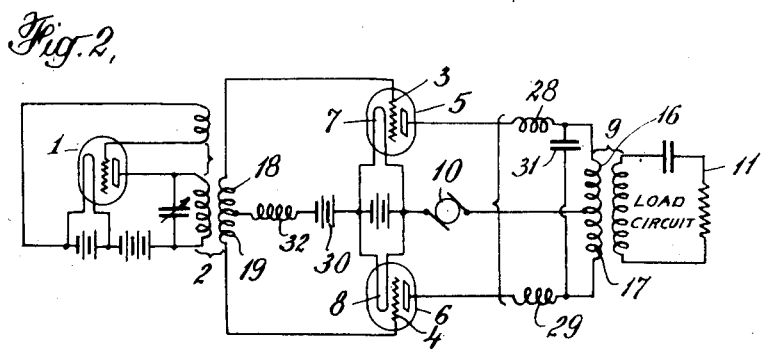
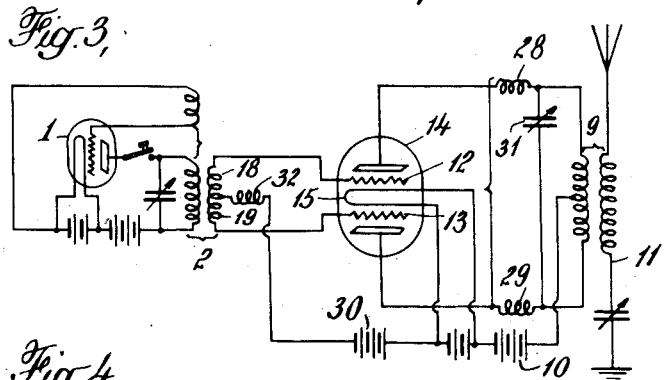
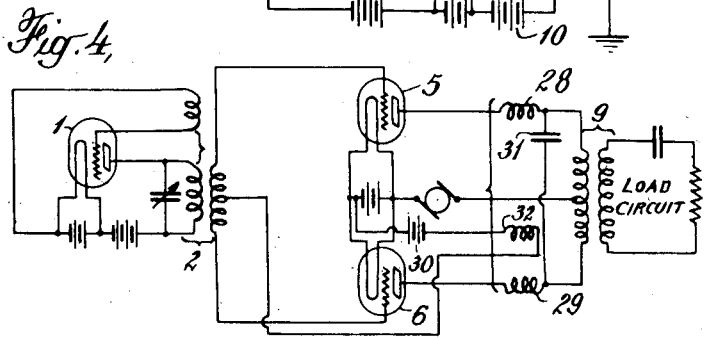
INVENTOR
Louis A. Hazeltine
BY
ATTORNEY Dec. 8, 1931. L. A. HAZELTINE 1,835,156
METHOD AND APPARATUS FOR CONVERTING DIRECT CURRENT INTO ALTERNATING
CURRENT BY ELECTROSTATICALLY CONTROLLED OSCILLATIONS
Filed Nov. 28, 1919  3 Sheets-Sheet 3
*Fig. 8*
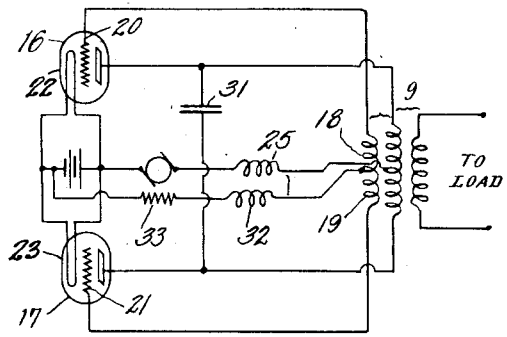
*Fig. 9*
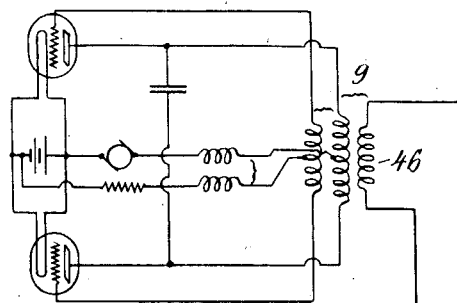
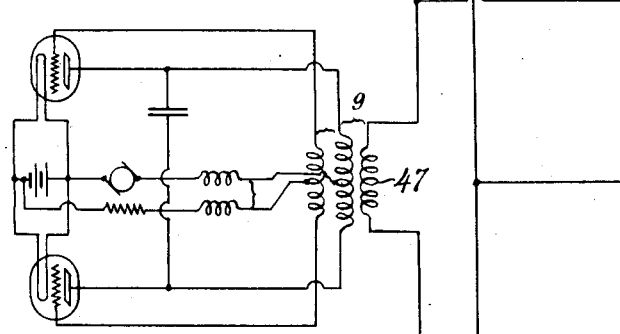
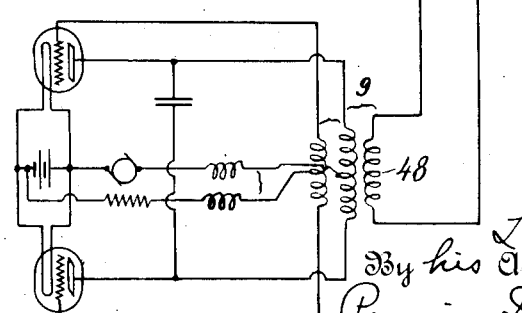
Inventor
Louis A. Hazeltine
By his Attorneys
Pennie, Davis, Marvin & Edmonds

Patented Dec. 8, 1931

1,835,156

UNITED STATES PATENT OFFICE

LOUIS A. HAZELTINE, OF HOBOKEN, NEW JERSEY, ASSIGNOR TO GENERAL ELECTRIC COMPANY, A CORPORATION OF NEW YORK

METHOD AND APPARATUS FOR CONVERTING DIRECT CURRENT INTO ALTERNATING CURRENT BY ELECTROSTATICALLY CONTROLLED OSCILLATIONS

Application filed November 28, 1919. Serial No. 341,150.

This invention relates to a method and apparatus for eliminating harmonics of the fundamental frequency and for improving the efficiency of an electrostatically controlled valve converter, such as may be used to convert direct-current power into alternating-current power for radio transmission, for multiplex telegraphy and telephony and for other purposes requiring an alternating current at readily controlled frequency, particularly high frequency.

The production of harmonics of the fundamental frequency in continuous-wave radio transmitting apparatus has been found to be a prolific source of interference. Such a transmitter will be heard not only by stations tuned to its wave length or fundamental frequency, but also by stations tuned to a multiple of its fundamental frequency or submultiple of its wave length.

High efficiency of a valve converter is very desirable, not only due to the ensuing saving of power but more especially to the greater permissible output from a given valve, since the output is usually limited mainly by the internal loss. Thus an improvement in efficiency from 50% to 90% would multiply the permissible output by nine with the same internal loss.

The converters referred to herein are of the electrostatically controlled valve type, the valve having three electrodes; a cathode maintained at incandescence or otherwise arranged to act as a source of electrons; an anode which receives the electrons emitted by the cathode; and a control electrode which serves to increase or decrease the intensity of the electron stream according to its potential.

The principle of operation of a valve converter such as described above is the variation in the valve or anode current which accompanies the variation in the potential of the control electrode. In the more powerful valve converters the valve current is not simply caused to vary, but it is caused to be actually interrupted periodically by the high negative potential attained by the control electrode. The variations in the valve current then have a wave form which is not sinusoidal—that is, it contains harmonics of the fundamental frequency. This is desirable from the standpoint of efficiency, since there can be no loss when there is no current, but it is undesirable if the harmonics of current affect the input or the output circuit. For high efficiency also, it is desirable that during the time while the valve current has a considerable magnitude, the valve voltage—that is, the drop between the anode and cathode—be small. This will require a voltage wave which also contains harmonics, which preferably should be prevented from appearing in the input or the output circuit.

In accordance with this invention such harmonics as are desirable for improving the efficiency are permitted to exist in the current and voltage of the valve circuit but are largely prevented from entering the input or the output circuit by a balanced arrangement of circuits having suitable inserted impedances.

It should be understood that the accompanying drawings, while they illustrate certain embodiments of the invention, are not the only circuit arrangements in which it is possible to embody the invention to improve the efficiency, or to eliminate undesirable harmonics, or both.

Referring to these drawings:—

Fig. 1a is a diagram representing a curve or working characteristic of a three-electrode valve which shows the relation between the valve current and the control potential, taking into account the variations in the valve voltage.

Fig. 1b is a diagram representing curves which show the variations of valve current, control potential, and valve voltage with time.

Fig. 2 shows a separately controlled converter including two three-electrode valves of the thermionic type arranged symmetrically and in which an impedance coil is inserted in the common wire of the control electrode circuits and coupled impedance coils are inserted in each valve circuit, a condenser being connected across the output circuit for tuning out odd harmonics of valve current.

Fig. 3 shows a converter in which the two separate valves are replaced by a single vacuum tube containing the two control electrodes, the two anodes, and a common cathode of the two valves.

Fig. 4 shows an arrangement similar to that of Fig. 2, but with coupling between the impedance coil in the control electrode circuit and the impedance coils in the valve circuits.

Fig. 8 shows a circuit diagram in which the valve converter is arranged to be regeneratively-controlled and has coupled impedance coils in the common wire of the control electrode circuits and in the common wire of the valve circuits.

Fig. 9 shows an arrangement for obtaining polyphase current from valve converters.

Figure 5:
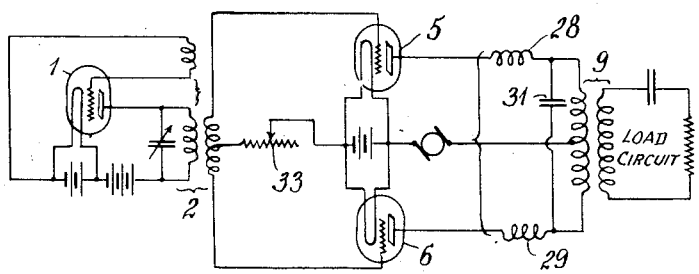
Fig. 5 shows a valve converter in which a resistance is used in the common wire of the control electrode circuit, the drop in this resistance taking the place of the biasing battery in the preceding figures.

Referring now to the diagram of Fig. 1a, the relation of the valve current $i_p$ is shown to the control potential $e_g$ taking into account the variations in the valve voltage $e_p$ which accompany variations in the control potential $e_g$.

In Fig. 1b desired variations of valve current $i_p$, control potential $e_g$, and valve voltage $e_p$, with time are shown, the control potential $e_g$ and the valve voltage $e_p$ each varying sinusoidally for a portion of the cycle and being low for the remainder of the cycle. The curve of the valve current $i_p$ is derived from that of the control potential $e_g$ by reference to the characteristic curve of Fig. 1a. These curves permit of the highest possible efficiency obtainable with a given valve, for the valve current is zero whenever the valve voltage is high. The limiting efficiency is 100%, which would be obtained if the characteristics of the valve itself did not require appreciable valve voltage during current flow.

In Fig. 2 is shown an arrangement giving the desired variation of valve current and valve voltage described above, in which 1 represents a master oscillator coupled by means of the transformer 2 to the control electrodes 3 and 4 of the power valves 5 and 6, the secondary winding 18, 19 of transformer 2 being provided with a mid-tap leading to the filaments 7 and 8 of the valves 5 and 6 through the impedance coil 32 and the biasing battery 30. The control potentials of the valves 5 and 6 then vary in opposite phase. As current can flow through a control electrode circuit only when the control electrode is positive, current will flow alternately through the two control electrode circuits. The combined current flows through the biasing battery 30 and the impedance coil 32. This current will contain even harmonics but no odd harmonics; so even harmonics of voltage will exist across it and therefore will appear in the control electrode potentials. If the coil 32 is of very high impedance, the current through it will be almost constant; so the current through each control electrode circuit will be almost constant for the half cycle of flow, and the same will be true of the control electrode potential, thus giving the wave form shown by $e_g$ in Fig. 1b. The valve currents will be permitted to flow only when the respective control electrodes are positive or slightly negative in potential, as indicated by the characteristic curve of Fig. 1a. Hence the valve currents will flow approximately for alternate half cycles. Now the valve currents flow through the impedance coils 28, 29, which are preferably closely coupled with such relative polarity that they offer high impedance to even harmonics and negligible impedance to the fundamental. If the impedance is very high, the sum of the two valve currents will be almost constant; so each valve current will also be almost constant for the half cycle of flow, and the same will be true of the valve voltage, thus giving the wave forms shown by $i_p$ and $e_p$, respectively, in Fig. 1b. The wave of valve voltage contains only even harmonics, which are absorbed reactively by series impedance coils 28, 29. Small even harmonics in the valve currents that may pass the impedance of coils 28, 29 will flow in opposite directions through the two halves 16, 17 of the primary winding of transformer 9 and so will balance one another with respect to their effect on the output or load circuit 11; they will however, flow through the input or generator circuit 10. Odd harmonics in the valve currents are largely absorbed reactively by the shunt condenser 31, which preferably is arranged to tune the circuit to the fundamental frequency; such small odd harmonics as remain flow in the same direction through the two halves 16, 17 of the primary winding of transformer 9 and so will balance one another with respect to the input circuit 10. Thus the circuit arrangement of Fig. 2 enables each valve voltage and valve current to contain such harmonics as correspond to a flow of valve current only for a portion of the cycle and a valve voltage during current flow which is minimized to a degree limited solely by the characteristics of the valve itself, these being the conditions for high efficiency illustrated by the curves of Fig. 1b.

Fig. 3 is a modification of Fig. 2 in which the two valves 5 and 6 of Fig. 2 are replaced by a structurally single valve 14 having two control electrodes and two anodes. In Fig. 3 the master-oscillator 1 is coupled to the control electrodes 12 and 13, corresponding to the control electrodes 3 and 4 of Fig. 2. The secondary of transformer 2 has its middle tap leading to the cathode 15 of the valve 14 through the biasing battery 30 and the impedance coil 32. The input circuit 10 is shown as a battery in place of a generator and the output circuit 11 is a radio antenna circuit. In other respects, Fig. 3 is identical with Fig. 2.

In case the alternating component of the control current in the circuit of Fig. 2 is very low, it would be impracticable to make the coil 32 of sufficient impedance, on account of its inherent shunt capacity. In such a case, coil 32 may be electromagnetically coupled to coils 28 and 29, as shown in Fig. 4, so that even harmonics of voltage will be induced in coil 32 by the even harmonics of current in coils 28 and 29.

Fig. 5 shows a circuit arrangement in which the battery 30 and coil 32 of Figs. 2 and 4 have been replaced by a resistance 33. The current through this resistance will consist of direct current and even harmonics and will cause a voltage of the same wave form to exist across it. The results are thus similar to those obtained by the use of battery 30 and coil 32 of Fig. 2, though the actual wave form of control potential will not be identical with that of Fig. 1b.

Figure 6:
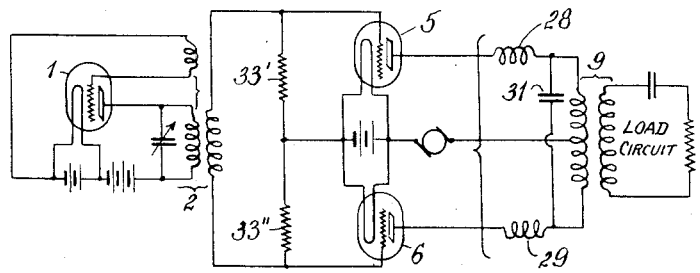
Fig. 6 shows an arrangement in which the single control electrode resistance is replaced by two resistances.

In place of the single resistance 33 of Fig. 5 in the common control circuit, two separate resistances may be used, each connected directly from one control electrode to the common cathode terminal, as shown by 33′ and 33″ in Fig. 6.

Figure 7:
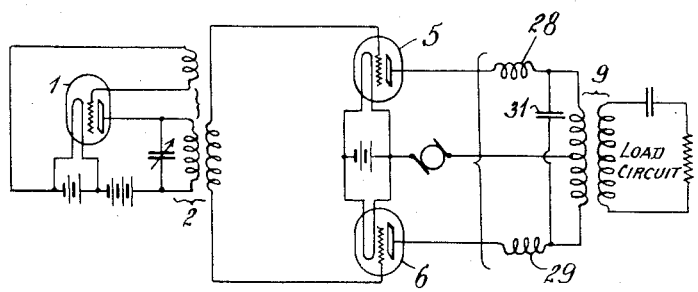
Fig. 7 shows an arrangement in which the control electrode resistances of the two preceding figures have been omitted.

If the valves of Fig. 6 have sufficient positive ionization, due to residual gas, this may afford an internal resistance or leak that will obviate the external resistances 33′ and 33″, leaving the simpler connections of Fig. 7.

With the connections of Figs. 5, 6 and 7, the curves differ from those of Fig. 1b in that the positive portion of the control potential will be roughly a half-sinusoid instead of a straight line, with a corresponding effect on the valve voltage.

Fig. 8 shows a regeneratively controlled valve converter having two valves 22 and 23, with an impedance coil 25 common to the valve circuits, and an impedance coil 32 and a resistance 33 common to the control circuits, coils 25 and 32 being magnetically coupled. These coils have the function of inserting even harmonics in the valve voltages and control potentials, due to the even harmonics of the common valve current flowing in coil 25. The resistance 33 has the function of biasing the control potentials due to its direct voltage drop accompanying its direct current. This resistance is preferable to a battery with self-excited power converters; for it will have a biasing voltage dependent on the load, and will assist in maintaining a stable oscillation.

The stability of oscillation in the regeneratively controlled converter of Fig. 8 is maintained by the presence of the resistance 33 in the common portion of the control electrode circuit. For example, if the load is increased, energy is first drawn from the stored energy of the oscillating circuit formed by the primary of transformer 9 and the condenser 31. This oscillation will then decrease in amplitude, with the result that the range in the values of the valve voltage $e_p$ will decrease, its means value remaining constant due to the direct-current source, so that its minimum value is high. If the mean value of the control potential $e_g$ also remained constant, as soon as its amplitude fell appreciably it would never become positive during a cycle, and no valve current could then flow; under this condition the oscillation would cease. However, as soon as the positive values of $e_g$ fall appreciably, less current will flow between the control electrodes and the cathodes, and the direct voltage across the resistance 33 will fall. Positive values of $e_g$ are thus maintained, and acting with the higher minimum values of $e_p$, permit higher anode currents to flow and so to keep up the oscillation.

All converter arrangements shown tend to regulate for approximately constant output voltage between the two anodes, and thence across the load circuit, as the load is varied, provided the drop between anode and cathode is low compared with the voltage of the direct-current source; for the root-mean-square value of the alternating voltage between the anodes is simply the direct voltage less the drop, multiplied by $$\left(\frac{\pi}{\sqrt{2}} = 2.22\right).$$

The efficiency in general will first rise as load is added and then will fall. These conditions are closely parallel to the conditions found in ordinary alternating-current generators.

Fig. 9 shows three self-excited oscillators each having valves arranged in pairs and having their output circuits coupled through the like coils 46, 47, 48. By adjusting the three converters to the same frequency, they will synchronize through these coils; and by making their output voltages equal, they will provide a three-phase circuit. This may be then transformed by well-known methods to any desired polyphase system, such as may be used for directional radio transmission. The three coils 46, 47, 48 will short-circuit such triple frequency harmonics as might otherwise exist in the output voltages.

I claim:—

1. The method of improving the efficiency of an electrostatically controlled valve converter of the high vacuum pure electron discharge type, which comprises permitting current to flow through a valve only for a portion of the cycle and minimizing the valve voltage during current flow to a degree limited solely by the characteristics of the valve itself.

2. In an electrostatically controlled valve converter including a plurality of high vacuum pure electron discharge type valves, the method of improving the efficiency without interrupting the total current, which comprises permitting current to flow successively through the valves and minimizing each valve voltage during current flow to a degree limited solely by the characteristics of the valve itself.

3. In an electrostatically controlled valve converter including a plurality of high vacuum pure electron discharge type valves, the method of improving the efficiency without interrupting the total current and without producing harmonics of current and voltage in the input and output circuits, which comprises permitting current to flow successively through the valves, minimizing each valve voltage during current flow to a degree limited solely by the characteristics of the valve itself, and absorbing substantially all the harmonics of valve current and valve voltage reactively.

4. The method of improving the efficiency of an electrostatically controlled valve converter of the high vacuum pure electron discharge type, which comprises applying such a control potential as to permit current to flow through a valve only for a portion of the cycle, introducing harmonics into the control potential, whereby the valve voltage is enabled to contain corresponding harmonics, and minimizing the valve voltage during current flow to a degree limited solely by the characteristics of the valve itself.

5. In an electrostatically controlled valve converter including a plurality of high vacuum pure electron discharge type valves, the method of improving the efficiency without interrupting the total current, which comprises applying such control potentials as to permit current to flow successively through the valves, introducing harmonics into the control potential of each valve, whereby the valve voltage is enabled to contain corresponding harmonics, and minimizing the valve voltage during current flow to a degree limited solely by the characteristics of the valve itself.

6. In an electrostatically controlled valve converter including a plurality of high vacuum pure electron discharge type valves, the method of improving the efficiency without interrupting the total current, without producing harmonics of current and voltage in the input and output circuits, and without requiring harmonics of voltage in the source of control, which comprises applying such control potentials as to permit current to flow successively through the valves, introducing harmonics into the control potential of each valve, whereby the valve voltage is enabled to contain corresponding harmonics, minimizing the valve voltage during current flow to a degree limited solely by the characteristics of the valve itself, absorbing the harmonics of valve current and valve voltage reactively, and absorbing the harmonics of control potential external to the source of control.

7. The method of improving the efficiency of an electrostatically controlled valve converter of the high vacuum pure electron discharge type, which comprises permitting current to flow through a valve only for approximately half of the cycle and minimizing the valve voltage during current flow to a degree limited solely by the characteristics of the valve itself.

8. In an electrostatically controlled valve converter including two high vacuum pure electron discharge type valves, the method of improving the efficiency without interrupting the total current, which comprises permitting current to flow alternately through the valves and minimizing each valve voltage during current flow to a degree limited solely by the characteristics of the valve itself.

9. In an electrostatically controlled valve converter including two high vacuum pure electron discharge type valves, the method of improving the efficiency without interrupting the total current and without producing harmonics of current and voltage in the input and output circuits, which comprises permitting current to flow alternately through the valves, minimizing each valve voltage during current flow to a degree limited solely by the characteristics of the valve itself, and absorbing substantially all the harmonics of valve current and valve voltage reactively.

10. The method of improving the efficiency of an electrostatically controlled valve converter of the high vacuum pure electron discharge type, which comprises applying such a control potential as to permit current to flow through a valve for approximately half of a cycle, introducing even harmonics into said control potential, whereby the valve voltage is enabled to contain even harmonics, and minimizing the valve voltage to a degree limited solely by the characteristics of the valve itself.

11. In an electrostatically controlled valve converter including two high vacuum pure electron discharge type valves, the method of improving the efficiency without interrupting the total current, which comprises applying such control potentials as to permit current to flow alternately through the valves, introducing even harmonics into the control potential of each valve, whereby the valve voltage is enabled to contain even harmonics, and minimizing the valve voltage during current flow to a degree limited solely by the characteristics of the valve itself.

12. In an electrostatically controlled valve converter including two high vacuum pure electron discharge type valves, the method of improving the efficiency without interrupting the total current, without producing harmonics of current and voltage in the input and output circuits, and without requiring harmonics of voltage in the source of control, which comprises applying such control potentials as to permit current to flow alternately through the valves, introducing even harmonics into the control potential of each valve, whereby the valve voltage is enabled to contain even harmonics, minimizing the valve voltage during current flow to a degree limited solely by the characteristics of the valve itself, absorbing the harmonics of valve current and valve voltage reactively, and absorbing the even harmonics of control potential external to the source of control.

13. In an electrostatically controlled valve converter, the combination of a plurality of high vacuum pure electron discharge type valves symmetrically associated with an input circuit and with an output circuit, a source of control permitting current to flow through the valves successively, and means for absorbing reactively the variations in the difference between the input and the output voltage of each valve circuit during current flow, whereby the valve voltage during current flow is minimized to a degree limited solely by the characteristics of the valve itself.

14. In an electrostatically controlled valve converter, the combination of a plurality of high vacuum pure electron discharge type valves symmetrically associated with an input circuit and with an output circuit, a source of control permitting current to flow through the valves successively, means for absorbing reactively the variations in the difference between the input and the output voltage of each valve circuit during current flow, whereby the valve voltage during current flow is minimized to a degree limited solely by the characteristics of the valve itself, and means for absorbing reactively variations in the differences between input and output currents.

15. In an electrostatically controlled valve converter, the combination of a plurality of high vacuum pure electron discharge type valves symmetrically associated with an input circuit and with an output circuit, a source of control permitting current to flow through the valves successively, means for introducing harmonics in the control potentials, and means for absorbing reactively the variations in the difference between the input and the output voltage of each valve circuit during current flow, whereby the valve voltage during current flow is minimized to a degree limited solely by the characteristics of the valve itself.

16. In an electrostatically controlled valve converter, the combination of a plurality of high vacuum pure electron discharge type valves symmetrically associated with an input circuit and with an output circuit, a source of control permitting current to flow through the valves successively, and means common to the circuits through the several valves for absorbing reactively the variations in the difference between the input and the output voltage of each valve circuit during current flow, whereby the valve voltage during current flow is minimized to a degree limited solely by the characteristics of the valve itself.

17. In an electrostatically controlled valve converter, the combination of a plurality of high vacuum pure electron discharge type valves symmetrically associated with an input circuit and with an output circuit, a source of control permitting current to flow through the valves successively, means common to the circuits through the several valves for absorbing reactively the variations in the difference between the input and the output voltage of each valve circuit during current flow, whereby the valve voltage during current flow is minimized to a degree limited solely by the characteristics of the valve itself, and means for absorbing reactively variations in the differences between input and output currents.

18. In an electrostatically controlled valve converter, the combination of a plurality of high vacuum pure electron discharge type valves symmetrically associated with an input circuit and with an output circuit, a source of control permitting current to flow through the valves successively, means for balancing out certain series of harmonics of valve voltage and valve current with respect to the input and output circuits and means for reactively absorbing the remaining harmonics, whereby each valve voltage and valve current is enabled to contain such harmonics as will correspond to a flow of valve current only for a portion of the cycle and a valve voltage during current flow which is minimized to a degree limited solely by the characteristics of the valve itself.

19. In an electrostatically controlled valve converter, the combination of a plurality of high vacuum pure electron discharge type valves symmetrically associated with an input circuit and with an output circuit, a source of control permitting current to flow through the valves successively, means for balancing out certain series of harmonics of valve voltage and valve current with respect to the input and output circuits, means for reactively absorbing the remaining harmonics, whereby each valve voltage and valve current is enabled to contain such harmonics as will correspond to a flow of valve current only for a portion of the cycle and a valve voltage during current flow which is minimized to a degree limited solely by the characteristics of the valve itself, and means for introducing harmonics in the control potentials.

20. In an electrostatically controlled valve converter, the combination of a plurality of high vacuum pure electron discharge type valves symmetrically associated with an input circuit and with an output circuit, a source of control permitting current to flow through the valves successively, means for balancing out certain series of harmonics of valve voltage and valve current with respect to the input and output circuits, means for reactively absorbing the remaining harmonics, whereby each valve voltage and valve current is enabled to contain such harmonics as will correspond to a flow of valve current only for a portion of the cycle and a valve voltage during current flow which is minimized to a degree limited solely by the characteristics of the valve itself, means for introducing harmonics in the control potentials, and means for absorbing said harmonics external to the source of control.

21. In an electrostatically controlled valve converter, the combination of a plurality of high vacuum pure electron discharge type valves symmetrically associated with an input circuit and with an output circuit, a source of control permitting current to flow through the valves successively, means common to the circuits through the several valves for reactively absorbing harmonics of valve voltage, and means transforming said harmonics into the control electrode circuits.

22. In an electrostatically controlled valve converter, the combination of two high vacuum pure electron discharge type valves symmetrically associated with an input circuit and with an output circuit, a source of control permitting current to flow through the valves alternately, and means for absorbing reactively the variations in the difference between the input and the output voltage of each valve circuit during current flow, whereby the valve voltage during current flow is minimized to a degree limited solely by the characteristics of the valve itself.

23. In an electrostatically controlled valve converter, the combination of two high vacuum pure electron discharge type valves symmetrically associated with an input circuit and with an output circuit, a source of control permitting current to flow through the valves alternately, means for absorbing reactively the variations in the difference between the input and the output voltage of each valve circuit during current flow, whereby the valve voltage during current flow is minimized to a degree limited solely by the characteristics of the valve itself, and means for absorbing reactively variations in the differences between input and output currents.

24. In an electrostatically controlled valve converter, the combination of two high vacuum pure electron discharge type valves symmetrically associated with an input circuit and with an output circuit, a source of control permitting current to flow through the valves alternately, means for introducing even harmonics in the control potentials, and means for absorbing reactively the variations in the difference between the input and the output voltage of each valve circuit during current flow, whereby the valve voltage during current flow is minimized to a degree limited solely by the characteristics of the valve itself.

25. In an electrostatically controlled valve converter, the combination of two high vacuum pure electron discharge type valves symmetrically associated with an input circuit and with an output circuit, a source of control permitting current to flow through the valves alternately, and means common to the circuits through the two valves for absorbing reactively the variations in the difference between the input and the output voltage of each valve circuit during current flow, whereby the valve voltage during current flow is minimized to a degree limited solely by the characteristics of the valve itself.

26. In an electrostatically controlled valve converter, the combination of two high vacuum pure electron discharge type valves symmetrically associated with an input circuit and with an output circuit, a source of control permitting current to flow through the valves alternately, means common to the circuits through the two valves for absorbing reactively the variations in the difference between the input and the output voltage of each valve circuit during current flow, whereby the valve voltage during current flow is minimized to a degree limited solely by the characteristics of the valve itself, and means for absorbing reactively variations in the differences between input and output currents.

27. In an electrostatically controlled valve converter, the combination of two high vacuum pure electron discharge type valves symmetrically associated with an input circuit and with an output circuit, a source of control permitting current to flow through the valves alternately, means for balancing out certain series of harmonics of valve voltage and valve current with respect to the input and output circuits and means for reactively absorbing the remaining harmonics, whereby each valve voltage and valve current is enabled to contain such harmonics as will correspond to a flow of valve current only for a portion of the cycle and a valve voltage during current flow which is minimized to a degree limited solely by the characteristics of the valve itself.

28. In an electrostatically controlled valve converter, the combination of two high vacuum pure electron discharge type valves symmetrically associated with an input circuit and with an output circuit, a source of control permitting current to flow through the valves alternately, means for balancing out certain series of harmonics of valve voltage and valve current with respect to the input and output circuits, means for reactively absorbing the remaining harmonics whereby each valve voltage and valve current is enabled to contain such harmonics as will correspond to a flow of valve current only for a portion of the cycle and a valve voltage during current flow which is minimized to a degree limited solely by the characteristics of the valve itself, and means for introducing harmonics in the control potentials.

29. In an electrostatically controlled valve converter, the combination of two high vacuum pure electron discharge type valves symmetrically associated with an input circuit and with an output circuit, a source of control permitting current to flow through the valves alternately, means for balancing out certain series of harmonics of valve voltage and valve current with respect to the input and output circuits, means for reactively absorbing the remaining harmonics, whereby each valve voltage and valve current is enabled to contain such harmonics as will correspond to a flow of valve current only for a portion of the cycle and a valve voltage during current flow which is minimized to a degree limited solely by the characteristics of the valve itself, means for introducing even harmonics in the control potentials, and means for absorbing said even harmonics external to the source of control.

30. In an electrostatically controlled valve converter, the combination of two high vacuum pure electron discharge type valves symmetrically associated with an input circuit and with an output circuit, a source of control permitting current to flow through the valves alternately, means common to the circuits through the two valves for reactively absorbing even harmonics of valve voltage, and means transforming said even harmonics into the control electrode circuits.

31. A polyphase valve converter comprising a plurality of electrostatically controlled high vacuum pure electron discharge type valves exceeding two, means for maintaining said valves in synchronism and in polyphase relation, and means for absorbing reactively the variations in the difference between the input and output voltage of each valve circuit during current flow, whereby the valve voltage during current flow is minimized to a degree limited solely by the characteristics of the valve itself.

32. The combination in a system for producing alternating current of a pair of electron discharge devices each having an anode, a cathode and a control electrode, an inductive winding having its terminals connected to the anode of said devices and an intermediate point connected to a source of direct current through an inductance, a second inductive winding which is inductively related to the first and has its terminals connected to the control electrodes of said devices and an intermediate point connected to the cathodes through a second inductance, the first and second inductances being inductively related to each other.

33. A system for producing alternating currents comprising a plurality of electron discharge devices having plate and grid circuits, a source of direct current for supplying current to the plate circuits, means comprising an inductance for reducing the variations in the current supplied by said source, means for impressing an alternating current upon the grid circuits and means comprising a second inductance in the grid circuit magnetically coupled to the first whereby such variations as do occur in the supply current are communicated to the current in the grid circuit.

34. A system for producing alternating currents comprising a plurality of electron discharge devices having plate and grid circuits, a coupling between said grid and plate circuits for furnishing excitation to the grids to maintain oscillations, a source of direct current for supplying current to the plate circuits, means comprising an inductance for reducing variations in the current supplied by said source, and means comprising an inductance in the grid circuit magnetically coupled to the first inductance, whereby such variations of current as may occur in the supply current produce corresponding current variations in the grid circuit.

35. A system for producing alternating currents comprising a plurality of electron discharge devices having plate and grid circuits, a coupling between said grid and plate circuits for furnishing excitation to the grids to maintain oscillations, a source of direct current for supplying current to the plate circuits and a second coupling between the supply circuit and the grid circuits for maintaining substantially constant the proportionality between the currents in the plate and grid circuits.

36. The combination of a plurality of circuits, a group of primary windings, means connected between said group and one of said circuits for causing current impulses of substantially rectangular wave form to be successively applied to said windings, and a group of secondary windings, arranged to supply to another of said circuits current impulses from which the fifth and seventh harmonics have been eliminated.

37. The combination of direct and alternating current circuits, a group of primary windings, means comprising a plurality of electrical valves connected between said group and said direct current circuit for causing current impulses of substantially rectangular wave form to be successively supplied to said winding, and a group of secondary windings arranged to supply said alternating current circuit polyphase currents from which the fifth and seventh harmonics have been eliminated.

38. The combination of a plurality of circuits, a group of primary windings, electrical valve means connected between one of said circuits and said windings, means arranged to cause current of substantially rectangular wave form to be supplied from said circuit through said valve means successively to said windings, and a group of secondary windings arranged to supply to another of said circuits current impulses of a wave form different from that of the current supplied to said primary windings.

39. The combination of a plurality of circuits, electrical valve means comprising a plurality of anodes and a plurality of grids each arranged to control the current of a different one of said anodes, a group of windings each connected to one of said circuits through a different one of said electrical valve means, grid potential control means arranged to cause current of substantially rectangular wave form to be supplied from said circuit through said anodes to said windings, and a second group of windings inductively related to said first mentioned group and arranged to supply to another of said circuits current impulses of a wave form different from the current impulses supplied to said first mentioned group.

In testimony whereof I affix my signature.

LOUIS A. HAZELTINE.